United States Patent [19]

Ueeda et al.

[11] Patent Number: 4,555,439
[45] Date of Patent: Nov. 26, 1985

[54] TOUGH THERMOPLASTIC RESIN SHEET-LIKE MATERIAL

[75] Inventors: Ryuhei Ueeda, Kurashiki; Kiyonobu Fujii, Kibi; Hiroshi Narukawa, Soja, all of Japan

[73] Assignee: Kuraray Company, Ltd., Kurashiki, Japan

[21] Appl. No.: 570,295

[22] Filed: Jan. 13, 1984

[30] Foreign Application Priority Data

Jan. 21, 1983 [JP] Japan .................................. 58-9169

[51] Int. Cl.$^4$ ...................... B32B 7/02; B32B 27/09; B28B 3/00
[52] U.S. Cl. .................................. 428/221; 428/480; 428/475.5; 428/523; 428/910; 264/319; 524/605; 524/606; 524/586; 524/584
[58] Field of Search ................... 428/221, 480, 475.5, 428/523, 910, 363, 220, 447, 323, 324, 325, 330, 331, 326; 264/280, 319; 524/605, 586, 584, 606, 449, 413, 13, 425, 451

[56] References Cited

U.S. PATENT DOCUMENTS 4,277,594 7/1981 Mattews et al. .................... 428/910
4,282,277 8/1981 Austen et al. ...................... 428/910

FOREIGN PATENT DOCUMENTS 161667 3/1979 Japan

*Primary Examiner*—Ellis P. Robinson
*Assistant Examiner*—Beverly K. Johnson
*Attorney, Agent, or Firm*—Oblon, Fisher, Spivak, McClelland & Maier

[57] ABSTRACT

According to the present invention, rolled sheet-like materials having superior mechanical properties, in particular toughness and high-impact properties, as well as superior heat resistance and showing no whitening can be provided.

Such rolled sheet-like materials are manufactured by isotropically rolling sheet-like materials, which were obtained by melting, blending and forming the mixture consisting of thermoplastic resin having the degree of crystallinity of 10% or more of 20 to 90% by weight and flaky fillers of 10 to 80% by weight, to orientate a part of crystals after it was melted at the melting point of said sheet-like materials and then recrystallizing the melted crystals under the rolled condition.

10 Claims, 3 Drawing Figures

TOUGH THERMOPLASTIC RESIN SHEET-LIKE MATERIAL

BACKGROUND OF THE INVENTION

1. Field of the Invention

The present invention relates to thermoplastic resin pressed sheet-like materials showing superior mechanical properties, in particular toughness and high-impact properties, as well as good appearance.

2. Description of the Prior Art

Recently, thermoplastic resin sheet-like materials themselves or the products obtained by vacuum forming, pressure forming, stamping forming and the like thereof are widely used in various kinds of vessel, parts of cars, parts of electric instruments and the like. It is, however, well known that the addition of flaky fillers to thermoplastic resin leads to the remarkable improvement in strength and elasticity for the field, wherein high strength and elasticity are required and anisotropism is undesirable, of the above described fields. In the case when still higher strength and modulus of elasticity are desired, as disclosed in for example Japanese Patent Application Laid-Open No. 161667/1979, the desired object can be achieved by pressing the compound at temperatures sufficiently higher than the melting point thereof to orientate flaky fillers. It is, however, the greatest disadvantage for the cases when flaky fillers are added to thermoplastic resin as reinforcing fillers that the compound becomes brittle, that is to say it shows low toughness and reduced impact resistance, in particular reduced Izod impact strength. Besides, this tendency becomes more remarkable with the orientation of flaky fillers. On the other hand, as disclosed in Japanese Patent Application Laid-Open No. 27203/1980, the transparency of thermoplastic resin sheet-like materials can be improved by stretching or pressing them at temperatures lower than the melting point of thermoplastic resin; and as disclosed in U.S. Pat. No. 4,282,277, the toughness of resins can be improved by pressing them at temperatures lower than the melting point of said resins. But, in the cases when flaky fillers are added to the compound, the stretched or pressed products show whitening owing to the phenomenon in which the superficial part thereof is stripped by the thickness of the same degree as that of said flaky fillers; the improvement of physical properties is unsatisfactory; or the dimensional resistance in an atmosphere of high temperatures is low whereby only the products having no practical use are obtained.

SUMMARY OF THE INVENTION

It is an object of the present invention to provide pressed sheet-like materials showing excellent mechanical properties such as strength, modulus of elasticity and the like, in particular excellent toughness and high-impact properties.

It is another object of the present invention to provide pressed sheet-like materials not showing the whitening phenomenon but showing good appearance.

It is further an object of the present invention to provide pressed sheet-like materials showing high dimensional resistance in an atmosphere of high temperatures.

These objects can be achieved by isotropically pressing sheet-like materials, which were obtained by melting, blending and forming the mixture consisting of thermoplastic resin having the degree of crystallinity of 10% or more of 20 to 90% by weight and flaky fillers of 10 to 80% by weight, orientating crystals after a part of them were melted at the melting point of said sheet-like materials and then recrystallizing the melted crystals under the pressed condition.

DETAILED DESCRIPTION OF THE INVENTION

Figure 1:
FIG. 1 is a scanning electron microscope photograph of a pressed sheet obtained in accordance with the present invention.

Thermoplastic resin having the degree of crystallinity of 10% or more used in the present invention includes polyethylene, polypropylene, nylon-6, nylon-66, polyethylene telephthalate, polybutylene telephthalate and the like. Polyethylene and polypropylene are preferably used for thermoplastic resin according to the present invention. In particular, polyethylene having molecular weight of 50,000 or more and polyprolylene having molecular weight of 250,000 or more are most preferably used. Also their modified resins and blends thereof can be used in accordance with their uses.

Flaky fillers used in the present invention include mica, glass flakes, talc and the like. Mica is preferably used for fillers used in the present invention. Mica can be selected from a group consisting of phlogopite, muscovite, fluorine mica and the like. It is necessary for these fillers to be flaky. Powdery and fibrous fillers, which are not flaky, have little effects according to the present invention. The weight-average particle diameter of said flaky fillers of 1.5 mm or less is desirable in respect of the appearance of sheet-like materials after forming. Besides, an aspect ratio (weight-averaged) of said flaky fillers of 10 or more is desirable in respect of strength and modulus of elasticity of said sheet-like materials after forming.

Tough and high-impact sheet-like materials according to the present invention are constructed from crystalline thermoplastics and flaky fillers used at a ratio of 10 to 80% by weight based on the compound. If said flaky fillers are used at a ratio less than 10% by weight, the effects according to the present invention can be hardly achieved while sheet-like materials can not be easily formed if said fillers are used at a ratio more than 80% by weight.

Also any other fillers than mica such as calcium carbonate, glass beads, silica, glass fiber, carbon fiber, aramide fiber, woodmeal and titanium compounds can be supplementarily used in the manufacture of tough thermoplastic resin sheet-like materials according to the present invention. In addition, also pigments, stabilizers, lubricants, silane coupling agents, ultra-violet light absorbers, heat deterioration inhibitors and the like can be used if necessary.

Melting point expressed in the present invention indicates the temperature range from the temperature, at which resin crystals begin to melt, to the temperature, at which melting of resin is completed. It can be determined by differential scanning calorimetry analysis (DSC). The heating-melting behavior of crystals of crystalline thermoplastics is generally observed by means of DSC. One of lower temperature side of intersecting points of the endothermic curve, which is obtained when crystalline thermoplastics are heated at the constant speed in the air or nitrogen gas to be melted, and the base line is the temperature, at which resin crystals begin to melt, while the other of higher temperature side is the temperature at which melting of resin is completed. Although sheet-like materials according to the present invention are manufactured by isotropically pressing them at such melting point, they are preferably pressed at the temperature corresponding to the summit of the absorption peak in order to obtain still better results. Although such characteristic temperatures are dependent upon the heating rate, too, in general, they are sufficiently agreed with the practical fabrication conditions if the measurement is carried out within the heating rate range of 5° to 20° C./min. These characteristic temperatures are hardly dependent upon ratios of flaky fillers to resin.

According to the present invention, it is necessary that the degree of crystallinity of thermoplastics is 10% or more. When thermoplastics having the degree of crystallinity less than 10% are used, pressed sheet-like materials, which are superior in respect of mechanical properties such as notched Izod impact strength and toughness as well as dimensional resistance, can not be obtained. Although the degree of crystallinity of thermoplastics can be determined by X-ray diffraction, the measurement of density, IR spectrum and heat of fusion, and the like, since the determination of the degree of crystallinity on the basis of X-ray diffraction or the measurement of heat of fusion is accurate for our invention, it is desired to use the determination of crystallinity on the basis of X-ray diffraction or the measurement of heat of fusion in the present invention.

According to the present invention, it is necessary that pressed sheet-like materials have the degree of orientation of 55% or more. If pressed sheet-like materials have the degree of orientation less than 55%, they can not satisfy mechanical performances aimed at in the present invention. The degree of orientation can be calculated from the following equation in which the half-value width (H) of the orientation-distribution curve determined by X-ray diffraction in the crystal plane parallel to molecular chain is used:

Degree of orientation (%) = (180 − H)/180 × 100

Furthermore, according to the present invention, it is required that the percentage change in thickness calculated from the measurement results at the temperature lower than the temperature, at which the crystals of resin begin to melt, by 20° C. is 2% or less. After pressed sheet-like materials were heated for one hour at the temperature lower than the temperature, at which the crystals of resin begin to melt, by 20° C. followed by being cooled to room temperature, the percentage change in thickness is calculated by the following formula on the basis of the measurement results of thickness.

Percentage change in thickness(%) = [(thickness after heating − thickness before heating)/thickness before heating] × 100

It is difficult to say that pressed sheet-like materials showing the percentage change in thickness larger than 2% are superior in dimensional resistance in an atmosphere of high temperatures.

In addition, it is required that notched Izod impact strength of pressed sheet-like materials according to the present invention is 2 or more times that of unpressed sheet-like materials and toughness of pressed sheet-like materials is 1.5 or more times that of unpressed sheet-like materials. Notched Izod impact strength is measured in accordance with ASTM D 256. Toughness can be calculated by (flexural strength × flexural deflection × ½) on the basis of flexural strength and flexural deflection measured in accordance with ASTM D 790. It is difficult to sayd that pressed sheet-like materials, of which notched Izod impact strength and toughness do not satisfy the above described values, are superior in mechanical performance.

Sheet-like materials according to the present invention include sheets of several mms thick and films of 10 μm thick. Such sheet-like materials are manufactured by isotropically pressing sheet-like materials, which were obtained by forming the mixture consisting of molten crystalline thermoplastic resin and flaky fillers by means of an extruder and a T-die, orientating crystals after a part of them was melted at the melting point of said sheet-like materials and then recrystallizing the melted crystals under the pressed condition. As described above, it is necessary that crystals partially remain when said sheet-like materials are pressed in the practice of the present invention. In the cases when sheet-like materials are formed by means of an extruder and a T-die and subsequently pressed, it is necessary to cool said sheet-like materials to the temperature range, in which at least a part of said sheet-like materials is crystallized, that is to say the temperature range from the temperature, at which the crystallization is started, to the temperature, at which the crystallization is completed, before said sheet-like materials are isotropically pressed. If said sheet-like materials are exposed to temperatures higher than the melting point thereof while pressing or after pressing, toughness and high-impact properties thereof are lost. Further, if said sheet-like materials are pressed at temperatures lower than the melting joint thereof, a strain is produced in an interface between flakes and resin when flakes are moved, thereby the superficial layer of said sheet-like materials is stripped by the thickness of the same order as that of the thickness of flakes and as a result said sheet-like materials are whitened. Also the dimensional resistance of the resulting sheet-like materials in an atmosphere of high temperatures is low. Whitening of said sheet-like materials leads to a remarkable reduction of mechanical properties of said sheet-like materials, in particular of high-impact properties and toughness. Whether whitening is observed in the superficial layer of said sheet-like materials or not can be easily comfirmed by means of a scanning electron microscopy.

Although the present invention is practiced at a pressing ratio of 1.5 to 20 in general, it is required to change a pressing ratio in dependence upon the kind of polymer, the mixing ratio of polymer and filler, the kind of filler, particle size of filler, aspect ratio and the like. For example, when polypropylene of 90% by weight is mixed with mica having an average particle diameter of 40 μm of 10% by weight, physical properties of said sheet-like materials are improved until pressing ratio of 6 but the further improvement can not be found in physical properties of said sheet-like materials at a pressing ratio more than 6. On the other hand, for example, when polypropylene of 60% by weight is mixed with mica having an average particle diameter of 70 μm of 40% by weight, toughness and high-impact properties are continuously improved until a pressing ratio of 18.

A flat sheet press, roll press and the like can be used for an apparatus for manufacturing pressed sheet-like materials according to the present invention. When a roll press is used, it is required to pass the sheet-like materials through said roll press in the longitudinal direction and the transverse direction twice or more. According to the present invention, it is possible to provide the products having remarkably improved toughness and high-impact properties as well as high heat resistance in addition to high modulus of elasticity and high strength without anisotropy and whitening. The present invention will be concretely described below with reference to the preferred embodiments. But the present invention is not limited by such preferred embodiments.

EXAMPLE 1

COMPARATIVE EXAMPLE 1, 2, 3

Phlogopite having an average particle diameter of 40 μm and an aspect ratio of 35 (Suzorite mica 325-S sold by KURARAY CO., LTD.) of 40% by weight was mixed with polypropylene having molecular weight of 400,000 of 60% by weight. The resulting mixture was molten and blended in an extruder of 40 mmφ. The resulting molten blend was extruded through a T-die having the width of 200 mm so as to form sheets. The resulting sheets were chilled by rolls, through which hot water of 80° C. was circulated. Thus sheets of 6 mm thick and 2 mm thick were obtained. The differential thermal analysis by a differential scanning calorimeter manufactured by Rigaku Denki Co., Ltd. was applied to a sample of the resulting sheets of 10 mg in the air at a heating rate of 10° C./min in the measuring temperature range from room temperature to 350° C. As a result, the heat absorption curve owing to the fusion of crystals of polypropylene at 155° C. (the temperature at which crystals begin to melt) to 170° C. (the temperature at which the melting of crystals is completed) was obtained with the peak at 163° C. Said sheets of 6 mm thick were preliminarily heated to 163° C., which is a peak temperature, and then pressed to the thickness of 3 mm (at a pressing ratio of 2) by means of a hydraulic press. After the pressed sheets were cooled to room temperature without eliminating the pressure, they were tested on flexural strength, flexural deflection and flexural modulus in accordance with ASTM D 790 and Izod impact strength (notched) in accordance with ASTM 256. The results are shown in Table 1. In addition, the values of (flexual strength × flexural deflection × ½) as the measure of toughnes were calculated. Also these values are shown in Table 1. Moreover, said sheets of 2 mm thick were preliminarily heated to 163° C. and then rolled at 163° C. to a thickness of 1 mm by means of a hydraulic press (pressing ratio of 2). The pressed sheets of 1 mm thick were tested on pulling strength in accordance with ASTM D 638 (EXAMPLE 1). Also the degree of crystallinity and the degree of orientation of crystals determined by X-ray diffraction are shown in Table 1. Furthermore, after heating said pressed sheets of 3 mm thick at 135° C. (the temperature lower than the temperature, at which crystals begin to melt, by 20° C.) for one hours and then cooling them to room temperature, their thickness was measured. The percentage change in thickness was calculated by the following formula:

Percentage change in thickness (%)=[(thickness after heating - thickness before heating)/thickness before heating]×100

These calculation results are shown in Table 2. The superficial layer of pressed sheets obtained according to EXAMPLE 1 was observed by a scanning electron microscopy (magnifications of 150). As shown in FIG. 1, whitening was not found.

Figure 2:
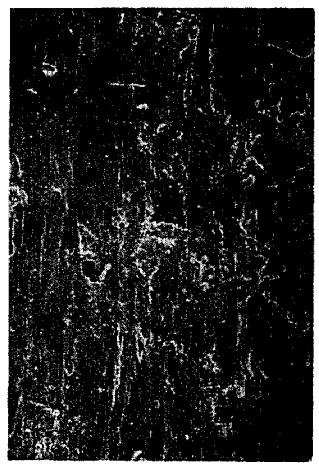
FIGS. 2 and 3 are scanning electron microscope photographs, at two different magnifications, of pressed sheets obtained in accordance with a method outside the scope of the present invention.
Figure 3:
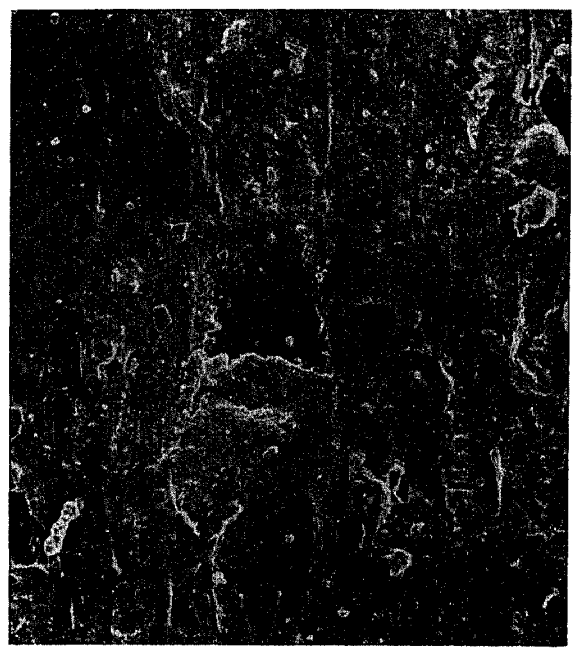

Then said sheets of 6 mm thick and 2 mm thick were preliminarily heated to 140° C. and then pressed at 140° C. (the temperature lower than the temperature, at which crystals begin to melt) by means of a hydraulic press in the same manner as in EXAMPLE 1. The resulting pressed sheets were tested on physical properties in the same manner as in EXAMPLE 1. The results are shown in Table 1 (COMPARATIVE EXAMPLE 1). The percentage change in thickness of the resulting pressed sheets of 3 mm thick was calculated in the same manner as in EXAMPLE 1. The results are shown in Table 2. The resulting pressed sheets obtained in COMPARATIVE EXAMPLE 1 were observed by a scanning electron microscopy (magnifications of 150 and 500). As shown in FIG. 2 and FIG. 3, whitening was found in the superficial layer of said resulting rolled sheets.

Said sheets of 6 mm thick and 2 mm thick were preliminarily heated to 185° C. and then pressed at 185° C. (the temperature higher than the temperature at which the melting of crystals is completed) by means of a hydraulic press in the same manner as in EXAMPLE 1.

The resulting pressed sheets were tested on physical properties in the same manner as in EXAMPLE 1. The results are shown in Table 1 (COMPARATIVE EXAMPLE 2). Furthermore, the physical properties of unpressed sheets are shown in Table 1 as COMPARATIVE EXAMPLE 3. The effects of the present invention are clearly found from the results of EXAMPLE 1 and COMPARATIVE EXAMPLES 1, 2, 3.

EXAMPLE 2

COMPRATIVE EXAMPLES 4, 5, 6

Phlogopite having an average particle diameter of 40 μm and an aspect ratio of 35 of 40% by weight was mixed with high-density polyethylene having a having molecular weight of 65,000 of 60% by weight. The resulting mixture was molten and blended in an extruder of 40 mmφ. The resulting molten blend was extruded through a T-die having the width of 200 mm so as to form sheets. The resulting sheets were chilled by rolls through which hot water of 80° C. was circulated. Thus sheets of 6 mm thick and 2 mm thick were obtained. As a result of differential thermal analysis, the heat absorption curve owing to the fusion of crystals of polyethylene at 118° to 150° C. was obtained with the peak at 132° C. Said sheets of 6 mm thick and 2 mm thick were preliminarily heated at 132° C., which is a peak temperature, and then pressed to the thickness of 3 mm and 1 mm (rolling ratio of 2 in every case) by means of a hydraulic press. After cooling to room temperature without eliminating the pressure, the pressed sheets were tested on the same physical properties as in EXAMPLE 1. The results are shown in Table 1 (EXAMPLE 2). The percentage change in thickness of said pressed sheets of 3 mm thick in an atmosphere of 98° C. was calculated in the same manner as in EXAMPLE 1. The results are shown in Table 2. Furthermore, the superficial layer of pressed sheets obtained in EXAM- PLE 2 was observed by a scanning electron microscopy. Alike to EXAMPLE 1, whitening was not found.

Said sheets of 6 mm thick and 2 mm thick were preliminarily heated to 155° C. and then pressed at 155° C. (the temperature higher than the melting point) by means of a hydraulic press in the same manner as in EXAMPLE 2. The resulting pressed sheets were tested on the same physical properties as in EXAMPLE 2. The results are shown in Table 1 (COMPARATIVE EXAMPLE 4). Also the physical properties of unpressed sheets are shown in Table 1 (COMPARATIVE EXAMPLE 5).

Said sheets of 6 mm thick were preliminarily heated to 100° C. and then pressed at 100° C. (the temperature lower than the melting point) in the same manner as in EXAMPLE 2. The resulting pressed sheets were tested on the same physical properties as in EXAMPLE 2. The results are shown in Table 1 (COMPARATIVE EXAMPLE 6). The percentage change in thickness of said resulting pressed sheets of 3 mm thick was calculated in the same manner as in EXAMPLE 2. The results are shown in Table 2. The superficial layer of the resulting pressed sheets obtained in COMPARATIVE EXAMPLE 6 was observed by a scanning electron microscopy. Alike to COMPARATIVE EXAMPLE 1, whitening was found. The effects of the present invention are clearly found from EXAMPLE 2 and COMPARATIVE EXAMPLES 4, 5, 6.

EXAMPLE 3

COMPARATIVE EXAMPLES 7

Glass flakes having an average particle diameter of 34 μm and an aspect ratio of 17 of 40% by weight was mixed with polypropylene having molecular weight of 200,000 of 60% by weight. The mixture was treated in the same manner as in EXAMPLE 1. Thus sheets of 6mm thick were formed. Said sheets were pressed in the same manner as in EXAMPLE 1. As a result pressed sheets of 3 mm thick were obtained. The resulting pressed sheets were tested on physical properties. The results are shown in Table 1.

Also physical properties of unpressed sheets are shown in Table 1 (COMPARATIVE EXAMPLE 7).

EXAMPLE 4

COMPARATIVE EXAMPLE 8

Phlogopite having an average particle diameter of 1.5 mm and an aspect ratio of 150 of 40% by weight was mixed with polypropylene having molecular weight of 400,000 of 60% by weight. The mixture was treated in the same manner as in EXAMPLE 1. Thus sheets of 6 mm thick and 3 mm thick were formed. Said sheets were pressed in the same manner as in EXAMPLE 1. As a result, pressed sheets of 3 mm thick were obtained. The resulting pressed sheets were tested on physical properties. The results are shown in Table 1. Also physical properties of unpressed sheets of 3 mm thick are shown in Table 1 (COMPARATIVE EXAMPLE 8). The effects of the present invention are clearly found from EXAMPLE 4 and COMPARATIVE EXAMPLE 8

EXAMPLE 5

COMPARATIVE EXAMPLE 9

Phlogopite having an average particle diameter of 60 μm and an aspect ratio of 35 of 70% by weight was mixed with nylon-6 (1022B manufactured by Ube Industries, Ltd.) of 30% by weight. The resulting mixture was molten and blended in an extruder of 40 mmφ at 240° C. The resulting molten blend was extruded through a T-die having the width of 200 mm. Thus sheets were formed. The resulting sheets were chilled by rolls through which hot water of 80° C. is circulated. As a result, sheets of 6 mm thick and 3 mm thick were obtained. As a result of differential thermal analysis, the heat absorption curve owing to the fusion of crystals of nylon-6 at 208° to 222° C. was obtained. Said sheets of 6 mm thick were preliminarily heated to 210° C. and then pressed to the thickness of 3 mm at 210° C. by means of a hydraulic press. After cooling to room temperature without eliminating the pressure, the pressed sheets were tested on physical properties (EXAMPLE 5). Unpressed sheets of 3 mm thick were tested on physical properties for comparison as they were (COMPARATIVE EXAMPLE 9). The effects of the present invention is clearly found from the results of EXAMPLE 5 and COMPARATIVE EXAMPLE 9 shown in Table 1.

EXAMPLE 6

COMPARATIVE EXAMPLES 10, 11, 12

Glass flakes having an average particle diameter of 75 μm and an aspect ratio of 40 of 20% by weight was mixed with ethylene-propylene block copolymer of 80% by weight. The resulting mixture was treated in the same manner as in EXAMPLE 1. Thus sheets of 6 mm thick were formed. Thermal analysis was applied to said sheets in the same manner as in EXAMPLE 1. As a result, the heat absorption curve owing to the fusion of crystals of ethylene-propylene block copolymer at 121° C. (the temperature at which crystals begin to melt) to 169° C. (the temperature at which the melting of crystals is completed) was obtained with a peak at 163° C. Said sheets of 6 mm thick were preliminarily heated to 160° C. and then pressed at 160° C. by means of a hydraulic press. Thus rolled sheets of 3 mm thick were obtained (rolling ratio of 2). After cooling to room temperature without eliminating the pressure, said pressed sheets were tested physical properties in the same manner as in EXAMPLE 1. The results are shown in Table 1 (EXAMPLE 6). Also said pressed sheets of 3 mm thick obtained in the same manner as in COMPARATIVE EXAMPLES 1, 2 were tested on physical properties (COMPARATIVE EXAMPLES 10, 1). The results are shown in Table 1. Also unpressed sheets were tested on physical properties (COMPARATIVE EXAMPLE 12). The results are shown in Table 1. The percentage change in thickness of pressed sheets of 3 mm thick obtained in EXAMPLE 6 and COMPARATIVE EXAMPLE 10 in an atmosphere of 101° C. was calculated in the same manner as in EXAMPLE 1. The results are shown in Table 2. Besides, the superficial layer of said pressed sheets was observed by a scanning electron microscopy. Whitening was not found for said pressed sheets obtained in EXAMPLE 6 but it was found for said pressed sheets obtained in COMPARATIVE EXAMPLE 10. The effects of the present invention are clearly found from the results of EXAMPLE 6 and COMPARATIVE EXAMPLE 10,11,12.

EXAMPLE 7

Phlogopite having an average particle diameter of 90 μm and an aspect ratio of 55 of 40% by weight was mixed with polypropylene having molecular weight of 400,000 of 60% by weight. The resulting mixture was extruded through a T-die having the width of 200 mm. Thus sheets of 1 mm thick and 3 mm thick were formed. Piled up sheets of 1 mm thick were preliminarily heated to 145° C. (the temperature lower than the melting point), 155° C. (the temperature at which crystals begin to melt), 163° C. (peak temperature), 170° C. (the temperature at which the melting of crystals is completed) and 180° C. (the temperature higher than the melting point), respectively and then pressed to the thickness of 3 mm at each of the above described temperatures by means of a hydraulic press. The pressed ratio was controlled in dependence upon the quantity of said sheets of 1 mm thick piled up. Physical properties of pressed sheets obtained under the above described pressing conditions are shown in Table 3. Also physical properties of unpressed sheets of 3 mm thick obtained by extrusion molding are shown in Table 3. The percentage change in thickness of said pressed sheets of 3 mm thick in an atmosphere of 135° C. was calculated in the same manner as in EXAMPLE 1. The results are shown in Table 2. Besides, the superficial layer of said pressed sheets obtained by pressing at 145° C., which is lower than the melting point, was observed by a scanning electron microscope. Whitening was found.

TABLE 1

|  | Flexural Strength (yield value) (kg/cm$^2$) | Flexural Deflection (yield value) (%) | Flexural Modulus (kg/cm$^2$) × 10$^4$ | Izod Impact Strength (notched) (kg·cm/cm) | Toughness ((kg·%/cm$^2$) | Pulling (yield value) (kg/cm$^2$) | Strength (breaking value) (kg/cm$^2$) | Pressed Sheet | Degree of Crystallization (%) | Degree of Orientation of Crystal (°) |
| --- | --- | --- | --- | --- | --- | --- | --- | --- | --- | --- |
| EXAMPLE 1 | 850 | 4.0 | 8.5 | 6.2 | 1700 | 420 | 400 |  | 68 | 65 |
| COMPARATIVE EXAMPLE |  |  |  |  |  |  |  |  |  |  |
| 1 | 820 | 2.4 | 8.0 | 3.9 | 984 | 410 | 400 | whitening | 72 | 60 |
| 2 | 820 | 1.8 | 8.5 | 2.1 | 738 | 430 | 400 |  | 69 | 50 |
| 3 | 730 | 2.2 | 7.7 | 2.3 | 803 | 400 | 360 |  | 49 | 50 |
| EXAMPLE 2 | 620 | 4.5 | 6.0 | 10.5 | 1395 | 420 | 390 |  | 75 | 76 |
| COMPARATIVE EXAMPLE |  |  |  |  |  |  |  |  |  |  |
| 4 | 570 | 3.4 | 5.8 | 4.8 | 969 | 320 | 320 |  | 70 | 53 |
| 5 | 570 | 3.0 | 5.6 | 4.9 | 855 | 320 | 310 |  | 75 | 0 |
| 6 | 580 | 3.6 | 6.1 | 6.0 | 1044 | — | — | whitening | 75 | 53 |
| EXAMPLE 3 | 820 | 3.6 | 7.0 | 4.7 | 1476 | — | — |  | 75 | 68 |
| COMPARATIVE EXAMPLE 7 | 720 | 1.9 | 6.2 | 2.3 | 684 | — | — |  | 78 | 52 |
| EXAMPLE 4 | 780 | 3.9 | 8.3 | 4.9 | 1521 | — | — |  | 68 | 65 |
| COMPARATIVE EXAMPLE 8 | 690 | 1.9 | — | 2.2 | 656 | — | — |  | 48 | 45 |
| EXAMPLE 5 | 1900 | 2.8 | 16 | 7.1 | 2660 | — | — |  | 25 | 65 |
| COMPARATIVE EXAMPLE 9 | 1800 | 1.3 | 15 | 3.0 | 1170 | — | — |  | 25 | 53 |
| EXAMPLE 6 | 470 | 7.2 | 2.5 | 58 | 1692 | — | — |  | 70 | 70 |
| COMPARATIVE EXAMPLE |  |  |  |  |  |  |  |  |  |  |
| 10 | 480 | 6.8 | 2.5 | 15 | 1632 | — | — | whitening | 72 | 62 |
| 11 | 480 | 6.8 | 2.6 | 8 | 1632 | — | — |  | 68 | 55 |
| 12 | 450 | 6.9 | 2.4 | 8 | 1553 | — | — |  | 52 | 54 |

TABLE 2

|  | Percentage Change of Thickness (%) | Atmospheric Temperature (°C.) |
| --- | --- | --- |
| EXAMPLE 1 | 0.2 | 135 |
| COMPARATIVE EXAMPLE 1 | 4.8 | 135 |
| EXAMPLE 2 | 0.2 | 98 |
| COMPARATIVE EXAMPLE 6 | 6.0 | 98 |
| EXAMPLE 6 | 0.2 | 101 |
| COMPARATIVE EXAMPLE 10 | 5.2 | 135 |
| EXAMPLE 7 | 0.1 | 135 |

| Rolling ratio | Pressing Temperature (°C.) | Flexural Strength (yield value) (kg/cm$^2$) | Flexural Deflection (yield value) (%) | Flexural Modulus (kg/cm$^2$) × 10$^4$ | Izod Impact Strength (notched) (kg·cm/cm) | Toughness (kg·%/cm$^2$) | Pressed sheet |
| --- | --- | --- | --- | --- | --- | --- | --- |
| 1 (Unrolled) |  | 740 | 2.1 | 7.1 | 3.0 | 777 |  |
| 2 | 163 | 860 | 4.0 | 9.0 | 6.5 | 1720 |  |
| 3 | 163 | 920 | 4.5 | 8.8 | 15 | 2070 |  |
| 6 | 163 | 840 | 5.2 | 7.2 | 22 | 2184 |  |
| 18 | 170 | 800 | 5.5 | 7.1 | 48 | 2200 |  |
| 3 | 145 | 720 | 2.8 | 6.8 | 4.4 | 1008 | whitening |
| 3 | 155 | 840 | 3.8 | 7.1 | 10 | 1596 |  |
| 3 | 170 | 840 | 3.6 | 8.8 | 9.0 | 1512 |  |

-continued

| Rolling ratio | Pressing Temperature (°C.) | Flexural Strength (yield value) (kg/cm$^2$) | Flexural Deflection (yield value) (%) | Flexural Modulus (kg/cm$^2$) × 10$^4$ | Izod Impact Strength (notched) (kg · cm/cm) | Toughness (kg · %/cm$^2$) | Pressed sheet |
|---|---|---|---|---|---|---|---|
| 3 | 180 | 860 | 2.0 | 8.8 | 2.8 | 860 | |

What is claimed is:

1. A pressed sheet like material characterized in that whitening is not found in the superficial layer upon electron microscope scanning, comprising: (1) a thermoplastic resin having a degree of crystallinity of 10% or more and present in amounts of 20 to 90% by weight, and (2) flaky fillers of 10 to 80% by weight, the degree of orientation of crystals in the crystal plane parallel to the molecular chain of said resin being 55% or more; the percentage change in thickness of said sheet-like material being 2% or less; said sheet-like material being further characterized by the fact that it is pressed and has a notched Izod impact strength which is 2 or more times that of unpressed sheet-like material and a toughness which is 1.5 or more times that of unpressed sheet-like material.

2. A pressed sheet-like material as set forth in claim 1, in which said thermoplastic resin is polyethylene or polypropylene.

3. A pressed sheet-like material as set forth in claim 1, in which said thermoplastic resin is polyethylene having molecular weight of 50,000 or more or polypropylene having molecular weight of 250,000 or more.

4. A pressed sheet-like material as set forth in claim 1, in which said fillers are mica.

5. The sheet-like material of claim 1, wherein said material is obtained by means of a flat sheet press or a roll press.

6. The sheet-like material of claim 1 wherein said thermoplastic resin comprises polyethylene, polypropylene, nylon-6, nylon-66, polyethylene terephthalate, polybutylene terephthalate and mixtures thereof.

7. The sheet-like material of claim 1 wherein said flaky filler comprises mica, glass flakes, calcium carbonate, glass beads, silica, glass fibers, carbon fibers, aramide fibers, woodmeal, titanium compounds, talc and mixtures thereof.

8. The sheet-like material of claim 4 wherein said mica comprises phlogopite mica, muscovite mica, fluorine mica and mixtures thereof.

9. The sheet-like material of claim 7 wherein said flaky filler has an average particle diameter of up to 1.5 mm.

10. The sheet-like material of claim 1 wherein said material further comprises pigments, stabilizers, lubricants, silane compiling agents, ultraviolet light absorbers, heat deterioration inhibitors or mixtures thereto.

* * * * *